United States Patent
Fee et al.

(10) Patent No.: US 6,889,011 B1
(45) Date of Patent: May 3, 2005

(54) INTEGRATED ADAPTIVE CHROMATIC DISPERSION/POLARIZATION MODE DISPERSION COMPENSATION SYSTEM

(75) Inventors: John A. Fee, Garland, TX (US);
Darius Subacius, Allen, TX (US);
Brian T. Teipen, Richardson, TX (US)

(73) Assignee: MCI, Inc., Ashburn, VA (US)

( * ) Notice: Subject to any disclaimer, the term of this patent is extended or adjusted under 35 U.S.C. 154(b) by 336 days.

(21) Appl. No.: 10/004,332

(22) Filed: Nov. 2, 2001

(51) Int. Cl.[7] .............................................. H04B 10/12
(52) U.S. Cl. ..................... 398/148; 398/149; 398/152; 398/161; 398/159
(58) Field of Search ................................ 398/147, 149, 398/159, 148, 152, 161, 158

(56) References Cited

U.S. PATENT DOCUMENTS

| | | | |
|---|---|---|---|
| 5,002,350 A | * 3/1991 | Dragone | 385/24 |
| 5,404,413 A | 4/1995 | Delavaux et al. | 385/15 |
| 5,822,100 A | 10/1998 | Robinson et al. | 359/161 |
| 6,236,495 B1 | 5/2001 | Moeller | 359/337 |
| 6,243,176 B1 | * 6/2001 | Ishikawa et al. | 398/141 |
| 6,266,457 B1 | 7/2001 | Jacob | 385/11 |
| 6,271,952 B1 | 8/2001 | Epworth | 359/161 |
| 6,310,716 B1 | 10/2001 | Evans et al. | 359/334 |
| 6,317,240 B1 | * 11/2001 | Penninckx et al. | 398/147 |
| 6,710,904 B1 | * 3/2004 | Penninckx et al. | 398/152 |

* cited by examiner

*Primary Examiner*—Jason Chan
*Assistant Examiner*—Christina Y Leung

(57) ABSTRACT

The present invention is directed to an integrated system for performing dispersion compensation on wavelength channels in WDM or DWDM transmissions. The system includes a tunable integrated dispersion compensation module that performs chromatic dispersion compensation and polarization mode dispersion compensation on each of the wavelength channels in the transmission. Feedback is used to adjust the tunable integrated dispersion compensation module until receiver performance is optimized.

60 Claims, 9 Drawing Sheets

INTEGRATED ADAPTIVE CHROMATIC DISPERSION/POLARIZATION MODE DISPERSION COMPENSATION SYSTEM

BACKGROUND OF THE INVENTION

1. Field of the Invention

The present invention relates generally to dispersion compensation, and particularly to an integrated system for providing chromatic dispersion compensation and polarization mode dispersion compensation.

2. Technical Background

Chromatic dispersion (CD) occurs because each wavelength of light travels through a given medium, such as an optical fiber, at a different speed. Since the various wavelengths of light have different velocities, a given wavelength of light will arrive at a receiver disposed at the end of a transmission fiber before another wavelength of light will arrive at that receiver. The time delay between different wavelengths of light leads to pulse broadening. Chromatic dispersion is obtained in an optical fiber by measuring fiber group delays in the time domain. Chromatic dispersion is a relatively stable phenomenon. FIG. 1 is a chart showing chromatic dispersion wavelength dependence. As shown, the main contribution is refractive index dispersion. CD wavelength dependence can be used to predict CD effects for different wavelength channels. Thus, passive chromatic dispersion compensation is relatively easy to perform.

FIG. 2 is a chart showing chromatic dispersion penalty curves for some ideal receiver at transmission rates of 10 G/s and 40 Gb/s. The curves shown in FIG. 2 correspond to a given bit error rate (BER=$10^{-13}$). Chromatic dispersion can be in the range of 300–500 psec in a 10 Gb/s system before incurring a 1 dB power penalty. In a 40 Gb/s system, the range decreases to 18–25 psec.

FIG. 3 is a chart showing sensitivity characteristics for chromatic dispersion for different receivers. Typically, chromatic dispersion compensation is adjusted to the optimized operating region of each receiver, as shown in FIG. 3.

Polarization is a critical parameter in optical communications. The fundamental mode of a single mode optical fiber is the solution to the wave equation that satisfies the boundary conditions at the core-cladding interface. Although this appears to be counter-intuitive, there are two solutions to the wave equation that correspond to the fundamental mode. The fiber is deemed to be a single mode fiber because both solutions have the same propagation constant. The two solutions are referred to as the polarization modes. These polarization components are mutually orthogonal. The state of polarization refers to the distribution of light energy between the two polarization modes. In practice, since the cross-sectional area of a fiber is not perfectly circular, the two polarization modes have slightly different propagation constants that give rise to pulse spreading. One polarization mode is referred to as the "fast-mode," and the other polarization mode is known as the "slow-mode." The fast mode and the slow mode mix as they travel down the fiber, becoming indistinguishable. The resulting difference in propagation time between polarization modes is known as the differential group delay (DGD).

FIG. 4 is a chart showing the wavelength dependency of polarization mode dispersion. A comparison of FIG. 1 and FIG. 4 reveals that PMD wavelength dependency is much more complicated than CD wavelength dependency. CD can be time variant as a result of changes with temperature or stress, but typically, the time variance of CD is not particularly strong. PMD, on the other hand, is very time variant, and thus, compensation should track with time. PMD describes the statistical broadening of optical pulses within an optical fiber caused by polarization effects. This broadening effect, similar to pulse broadening from chromatic dispersion, ultimately prevents the correct detection of the waveform at the receiver. DGD is usually described statistically using Maxwell's distribution. As discussed above, PMD is unlike chromatic dispersion because DGD fluctuates with time, wavelength, environmental conditions and with other parameters. The statistical behavior of PMD makes passive PMD compensation ineffective.

PMD is the major limiting factor for high bit-rate transmissions. FIG. 5 shows approximate PMD power penalty curves for 10 Gb/s and 40 Gb/s optical transmission speeds. These curves are approximate because a real curve depends on various transmitter and receiver properties. A PMD power penalty of 1 dB corresponds to an instantaneous DGD value of 0.4 times the bit period. For a 10 Gb/s system this translates to approximately 40 psec. For a 40 Gb/s system it translates to about 5 psec, which is significantly lower.

Currently, chromatic dispersion and PMD are compensated for separately. Optical transmission link power or signal-to-noise ration (SNR) budgeting typically takes into account CD and PMD caused penalties separately. However, a more accurate chromatic dispersion compensation allows for a higher PMD penalty on the link and vice-versa. What is needed is an integrated approach to chromatic dispersion and PMD compensation. What is needed is an integrated dispersion compensation method that is performed to optimize a specific receiver's performance. Further, the optimization should be specific to a given transmitter-receiver combination.

SUMMARY OF THE INVENTION

The present invention provides an integrated approach to CD and PMD compensation. The integrated dispersion compensation method of the present invention can be employed to optimize any specific receiver's performance. Further, the integrated dispersion compensation method of the present invention can be employed to optimize any given transmitter-receiver combination.

One aspect of the present invention is an integrated system for performing dispersion compensation on at least one wavelength channel. The system includes a tunable integrated dispersion compensation module configured to perform chromatic dispersion compensation and polarization mode dispersion compensation on the at least one wavelength channel. A feedback element is coupled to the integrated dispersion compensation module. The feedback element is configured to provide a feedback control signal to thereby adjust the tunable integrated dispersion compensation module until a predetermined characteristic of the at least one wavelength channel is optimized.

In another aspect, the present invention includes an integrated optical receiver system for receiving at least one wavelength channel in an optical transmission. The system includes a controller configured to measure at least one characteristic of the at least one wavelength channel and generate at least one control signal in accordance with the measured at least one characteristic. A feedback element is coupled to the controller. The feedback element is configured to propagate the at least one control signal. An integrated dispersion compensation module is configured to apply chromatic dispersion compensation and polarization mode dispersion compensation to the at least one wavelength channel in accordance with the at least one control signal to thereby optimize the at least one characteristic.

In another aspect, the present invention includes a method for performing dispersion compensation in a receiver in an optical network. The method includes providing an integrated dispersion compensation module. The integrated dispersion compensation module is coupled to the receiver via a feedback control loop. At least one characteristic of at least one wavelength channel in an optical transmission is measured. A first feedback control signal is transmitted to the integrated dispersion compensation module via the control loop. The first control signal is derived from the measured at least one characteristic, whereby the integrated dispersion compensation module applies chromatic dispersion compensation to the at least one wavelength signal in response to the first feedback control signal. A second control signal is transmitted to the integrated dispersion compensation module via the control loop. The second control signal is derived from the measured at least one characteristic, whereby the integrated dispersion compensation module applies polarization mode dispersion compensation to the at least one wavelength signal in response to the second feedback control signal.

In another aspect, the present invention includes a method for performing dispersion compensation in an optical network. The method includes the step of providing an integrated dispersion compensation module. The integrated dispersion compensation module is coupled to the receiver via a feedback control loop. At least one characteristic of at least one wavelength channel in an optical transmission is measured. At least one feedback control signal is transmitted to the integrated dispersion compensation module via the control loop. The at least one feedback control signal is derived from the measured at least one characteristic, whereby the integrated dispersion compensation module applies chromatic dispersion compensation and polarization mode dispersion compensation to the at least one wavelength signal in response to the at least one feedback control signal.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
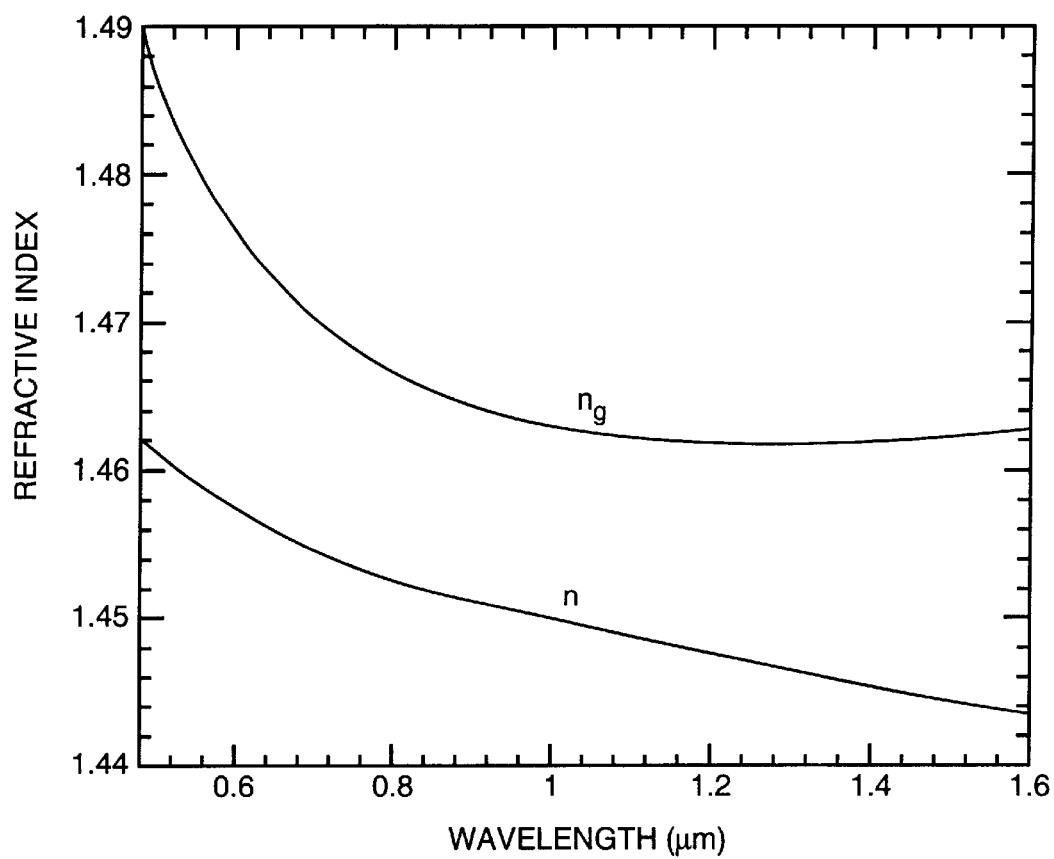
FIG. 1 is a chart showing chromatic dispersion wavelength dependence.
Figure 2:
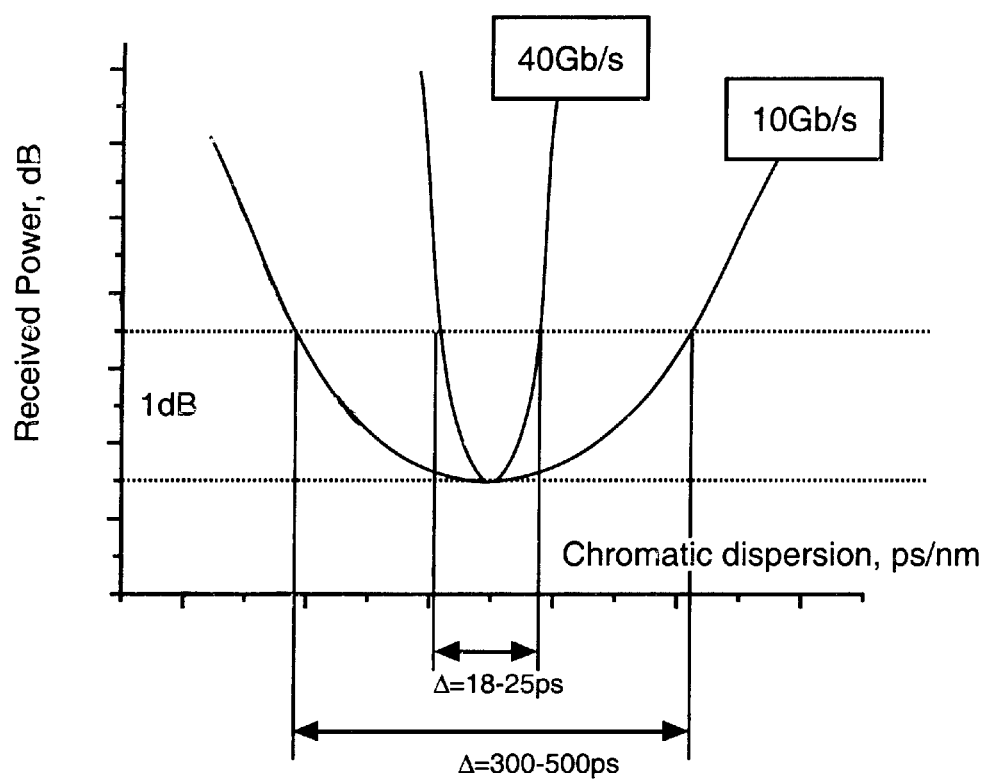
FIG. 2 is a chart showing chromatic dispersion penalty curves for an ideal receiver at transmission rates of 10 G/s and 40 Gb/s.
Figure 3:
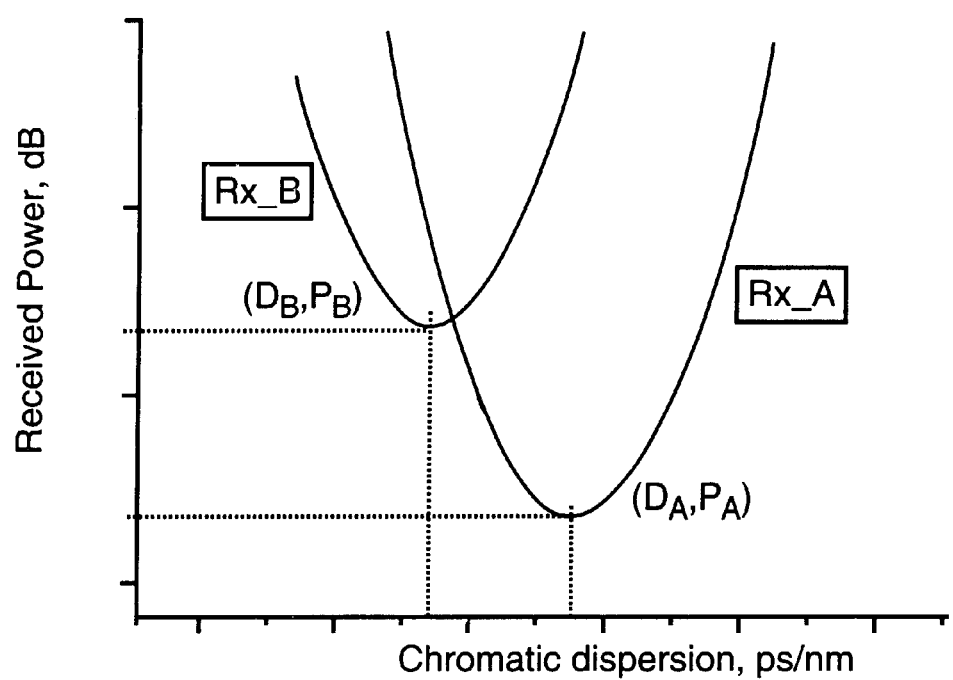
FIG. 3 is a chart illustrating the sensitivity of different receivers to chromatic dispersion.
Figure 4:
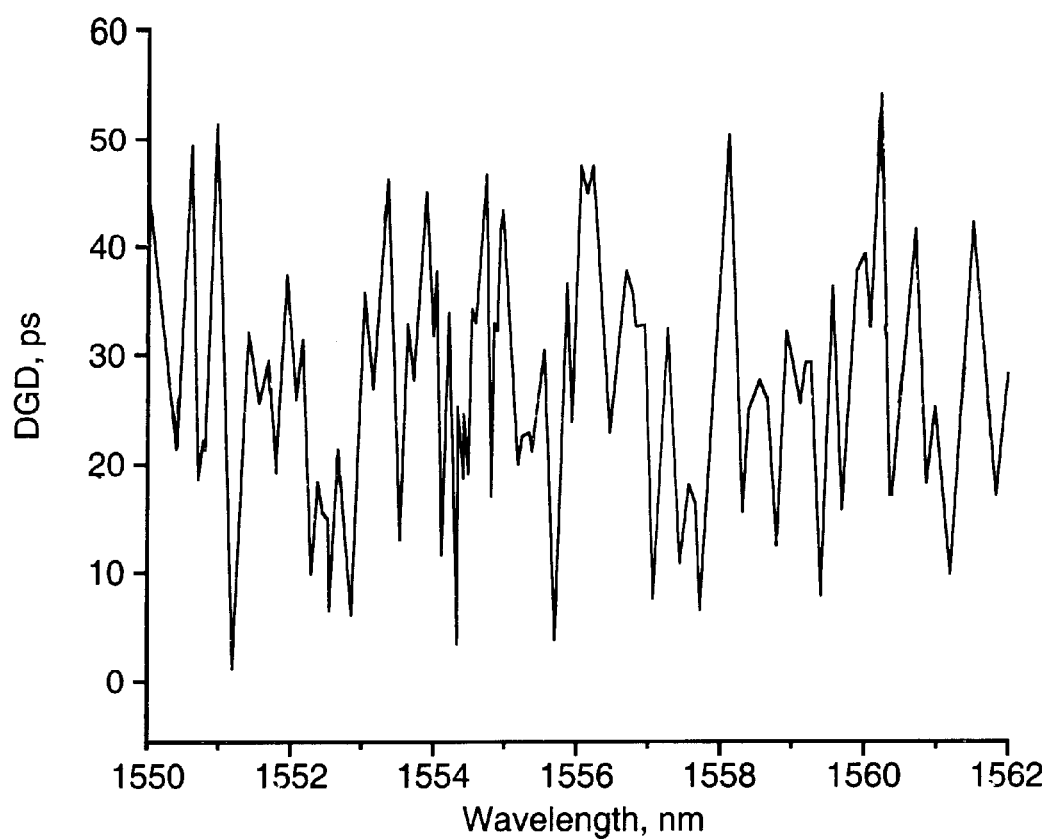
FIG. 4 is a chart showing the wavelength dependency of polarization mode dispersion.
Figure 5:
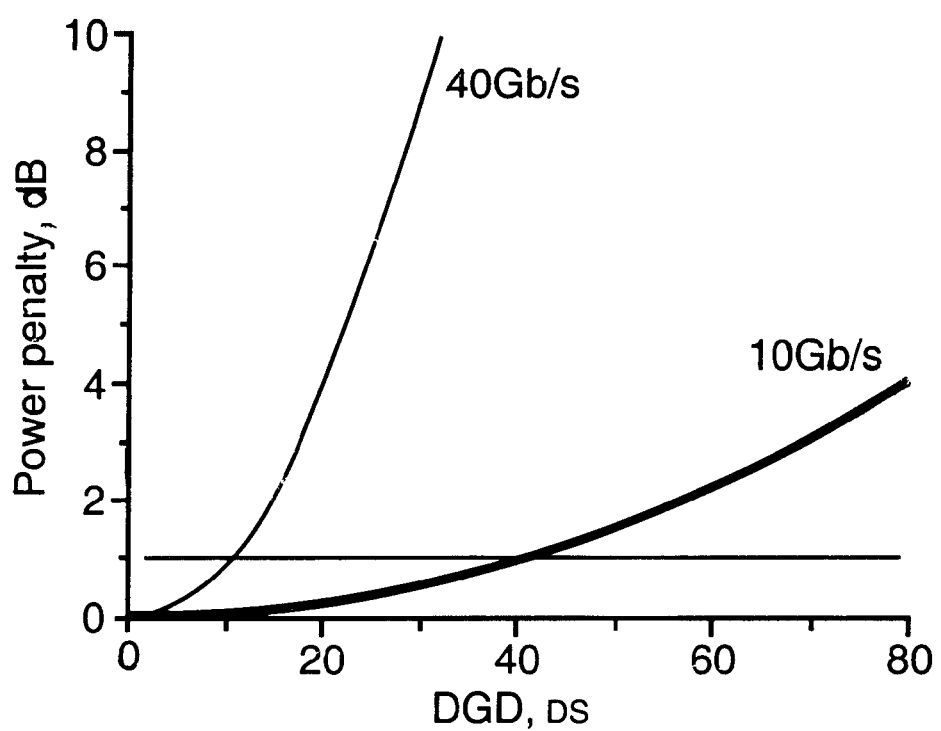
FIG. 5 is a chart showing approximate PMD power penalty curves for 10 Gb/s and 40 Gb/s optical transmission speeds.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the integrated dispersion compensation system of the present invention is shown in FIG. 6, and is designated generally throughout by reference numeral 10.

In accordance with the invention, the present invention is directed to an integrated system for performing dispersion compensation on at least one wavelength channel. The system includes a tunable integrated dispersion compensation module configured to perform chromatic dispersion (CD) compensation and polarization mode dispersion compensation (PMD) on the at least one wavelength channel. A feedback element is coupled to the integrated dispersion compensation module. The feedback element is configured to provide at least one feedback control signal to thereby adjust the tunable integrated dispersion compensation module until a predetermined characteristic of the at least one wavelength channel is optimized. Thus, the present invention provides an integrated approach to CD and PMD compensation. As described below, the present invention also helps to compensate for higher order PMD as well. The integrated dispersion compensation method of the present invention can be employed to optimize any specific receiver's performance. Further, the integrated dispersion compensation method of the present invention can be employed to optimize any given transmitter-receiver combination.

Figure 6A:
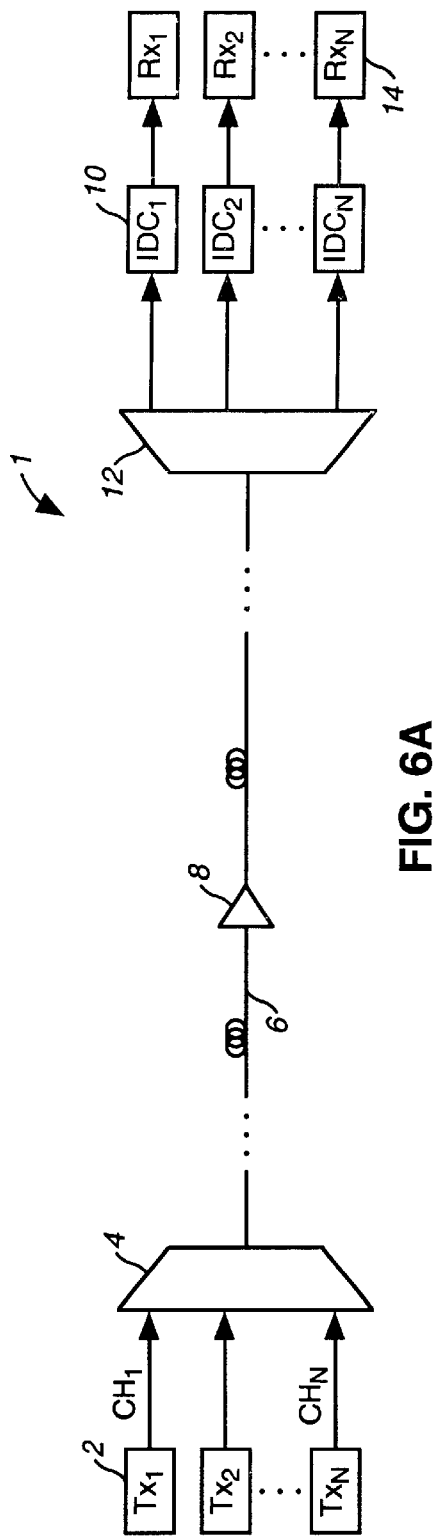
FIG. 6A is a block diagram of a communications system employing the integrated dispersion compensation system of the present invention.

As embodied herein, and depicted in FIG. 6A, a block diagram of a communications system employing the integrated dispersion compensation system of the present invention is disclosed. Individual channel transmitters 2 are coupled to multiplexer 4 to create a multiplexed signal (Ch 1–Ch N). The multiplexed signal is transmitted by way of optical fiber 6. Subsequently, the multiplexed signal is amplified by amplifier 8 and re-transmitted on fiber 6 to demultiplexer 12. In the current state of the art, amplifier 8 typically includes a dispersion compensation module. However, CD cannot be perfectly compensated for all channels. Usually there is a residual CD for different channels, and the slope compensation is not perfect. Demultiplexer 12 demultiplexes the multiplexed signal into its constituent channels. Each channel is provided to integrated dispersion compensation system 10 for tunable compensation. Thus, CD compensation and PMD compensation (1$^{st}$ order and higher order) are performed for each channel.

It will be apparent to those of ordinary skill in the pertinent art that any suitable means may be used to implement multiplexer 12 and demultiplexer 4, but there is shown by way of example a diffraction grating. Those of ordinary skill in the art will recognize that prism based devices may also be used.

Figure 6B:
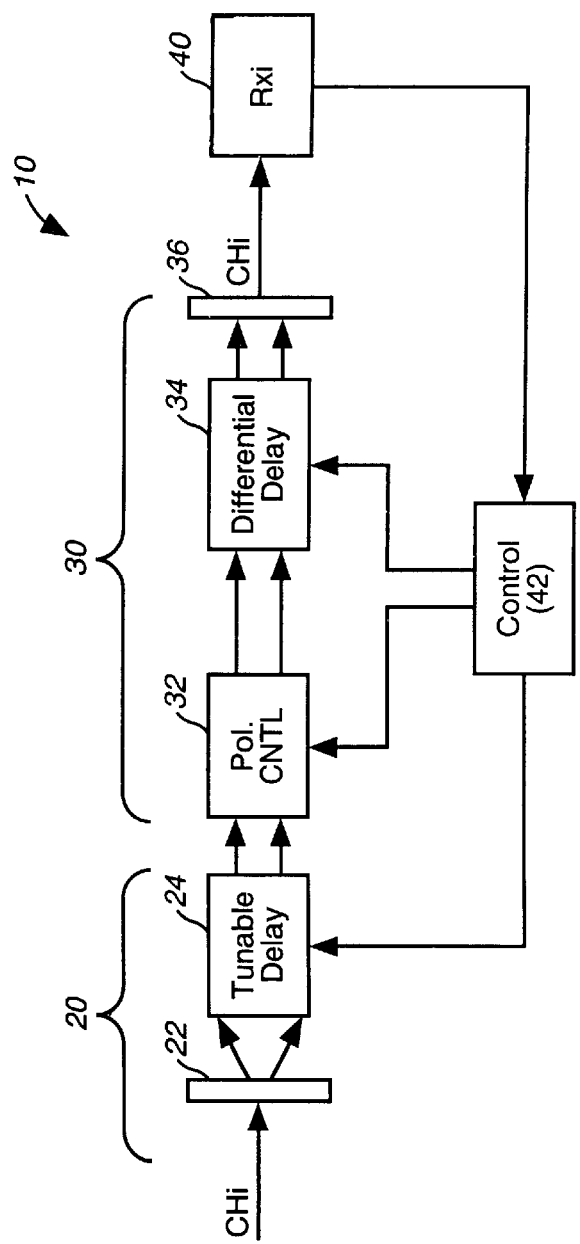
FIG. 6B is a block diagram of an integrated dispersion compensation system for performing dispersion compensation in accordance with one embodiment of the present invention.

As embodied herein, and depicted in FIG. 6B, a block diagram of an integrated dispersion compensation system 10 for performing dispersion compensation in accordance with one embodiment of the present invention is disclosed. System 10 includes tunable chromatic dispersion (CD) compensation portion 20 coupled to polarization mode dispersion (PMD) compensation portion 30. CD compensation portion includes dispersive element 22 coupled to tunable delay unit 24. As described above, CD leads to pulse broadening because different frequency components travel faster or slower than other frequency components. Thus, dispersive element 22 breaks channel (i) into its various frequency components. The faster components are delayed by tunable delay 24 causing the various components to be time aligned. Because chromatic dispersion is also wavelength dependent, each wavelength channel is adjusted individually for chromatic dispersion.

It is noted that the above described CD compensation also corrects second order PMD. PMD is often presented as a series of first order, second, and higher order PMD. Second order PMD includes a term which is similar to CD, so called polarization dependent CD. This part of the second order PMD is also compensated for by CD portion 20. PMD is characterized by two orthogonal states of polarization called the principal states (PSP) and the differential group delay. PMD is described mathematically using a Stokes vector:

$$\Omega = \Delta\tau \cdot q \quad (1),$$

where $\Delta\tau$ is the DGD value and q is a unit vector pointing in the direction of the fast PSP. Second order PMD is obtained by differentiation:

$$\Omega_\omega = \Delta\tau_\omega \cdot q + \Delta\tau \cdot q_\omega \quad (2),$$

where "ω" denotes differentiation. The derivative of DGD with respect to frequency is $\Delta\tau_\omega$. In other words, $\delta/\delta\omega = \Delta\tau_\omega$, which is a term that is similar to chromatic dispersion. Thus, by compensating for CD, this term is also compensated.

PMD compensation portion 30 compensates for first order PMD. PMD compensation portion 30 includes polarization controller 32 disposed between tunable delay unit 24 and differential delay 34. Polarization controller 32 functions to ensure that differential delay 34 receives exclusively the "slow-mode" component and the "fast-mode" component for the particular wavelength channel. Delay unit 34 introduces unequal time delays between the components of each wavelength channel. Each applied delay must be opposite and equal to the time difference between the fast mode pulse and the slow mode pulse, if the fast mode pulse and the slow mode pulse are to be time aligned. Note that this compensates for higher PMD because the PSP for pulse frequency polarization components is controlled.

Differential delay unit 34 is coupled to beam combiner unit 36. Beam combiner 36 recombines the frequency components of the channel. Beam combiner 36 provides receiver 40 with a dispersion compensated wavelength channel. Control electronics 42 is coupled to differential delay unit 34, polarization controller 32, and to tunable delay unit 24. Essentially, receiver 40 provides control electronics with a bit-error rate (BER), a DGD value, or a Q-factor for the channel. Control electronics 42 derives a feedback control signal to control each of the elements with system 10. Thus, integrated dispersion compensation system 10 utilizes feedback control signals to optimize BER or the Q-factor, or any other selected performance characteristic.

Those of ordinary skill in the art will recognize that tunable CD element 24 or differential delay 34 can be implemented using a free-space device or a fiber device. For example, both of these elements can be implemented using a tunable chirped fiber Bragg grating. The delay can be adjusted mechanically or by using a temperature based actuator.

Figure 7:
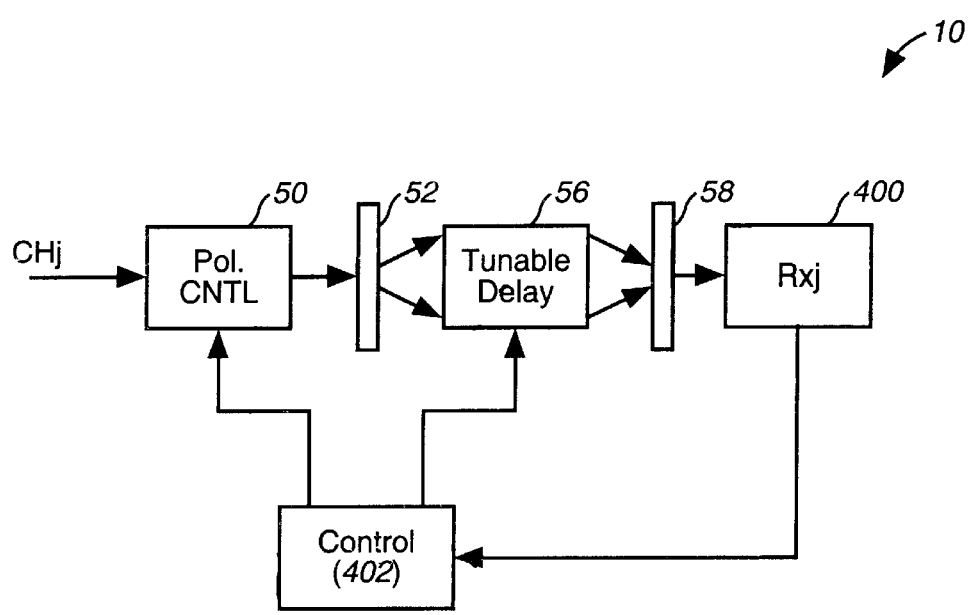
FIG. 7 is a block diagram of an integrated dispersion compensation system for performing dispersion compensation in accordance with an alternate embodiment of the present invention.

As embodied herein and depicted in FIG. 7, a block diagram of integrated dispersion compensation system 10 for performing dispersion compensation in accordance with an alternate embodiment of the present invention is disclosed. In this embodiment, CD compensation and PMD compensation are performed simultaneously. System 10 includes polarization controller 50 coupled to dispersive element 52. As discussed above, polarization controller ensures that the substantially the fast mode and slow mode polarization components are provided to tunable delay 56. Subsequently, dispersion compensated polarization components for the channel are provided to beam combiner 58. Receiver 400 measures the bit-error rate (BER), the DGD value, or the Q-factor for the channel. Feedback control electronics 402 uses this information to derive feedback control signals for both polarization controller 50 and tunable delay 56 to thereby optimize BER, the Q-factor, or any other receiver performance criteria.

Figure 8:
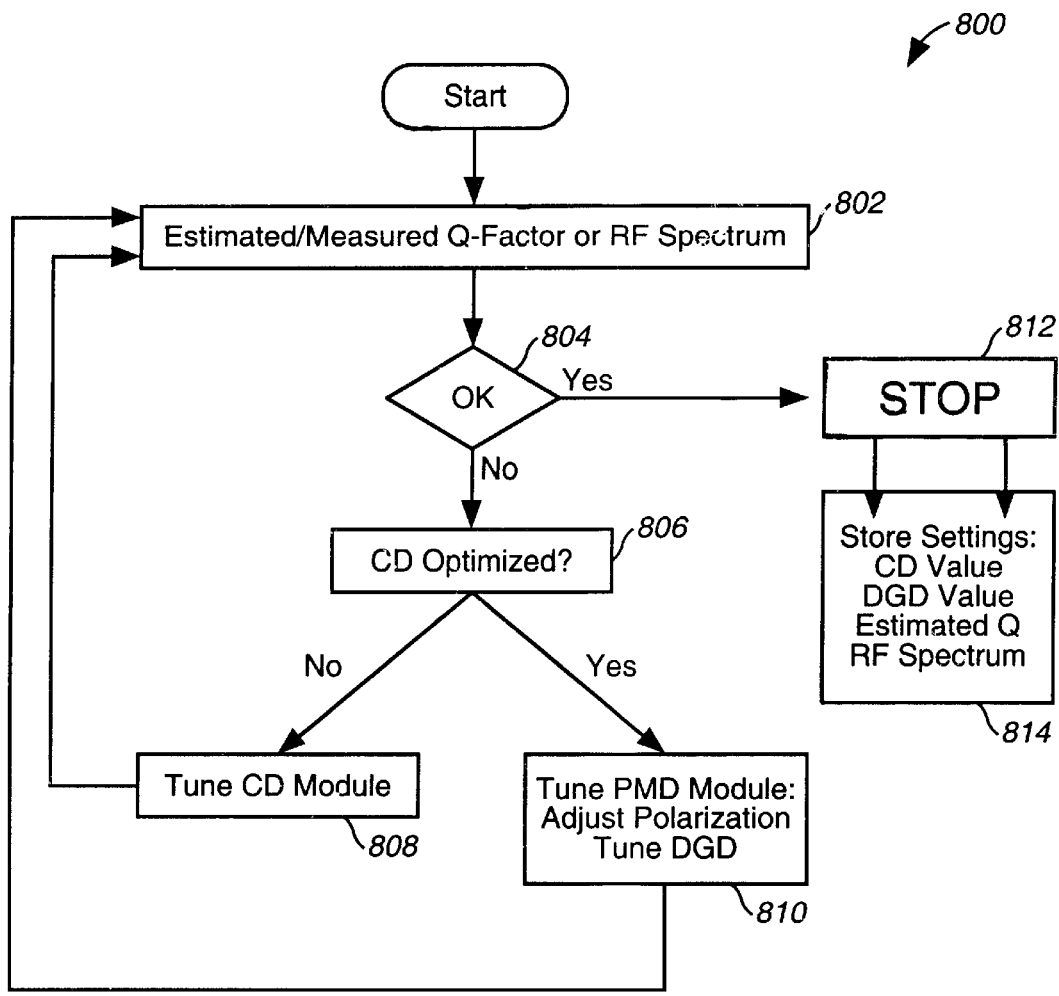
FIG. 8 is a method of performing dispersion compensation in accordance with another embodiment of the present invention.

As embodied herein, and depicted in FIG. 8, a method for performing dispersion compensation in accordance with another embodiment of the present invention is disclosed. The method of FIG. 8 is stored in memory in the control electronics in receiver 40 (first embodiment), or the control electronics 402 in the second embodiment. These devices will be referred to as the "controller" in the following description. In step 802, the receiver, or an optical monitor in the receiver, measures the Q-factor, BER, or some other relevant measurement characteristic. A histogram or eye-diagram may also be used. Those of ordinary skill in the art will recognize that any suitable method may be employed to measure receiver performance depending on the sophistication of the receiver electronics and the control electronics. In step 804, the control electronics compares the measured characteristic with a predetermined optimal range of characteristic values. If the measured characteristic is within the optimal range, no compensation is performed, and the controller stores the CD value, the DGD value with the measured characteristic (Q-factor, BER, etc.). If the measured characteristic is not within the optimal range, the controller performs CD compensation in step 808. The controller uses a feedback control signal to tune CD compensation portion 20. After CD is optimized, the receiver/controller uses a feedback control signal to tune PMD compensation portion 30. Once the measured characteristic is driven into the optimal range, program flow is directed to step 812 and the controller stores the CD value, the DGD value with the measured characteristic in step 814.

Figure 9:
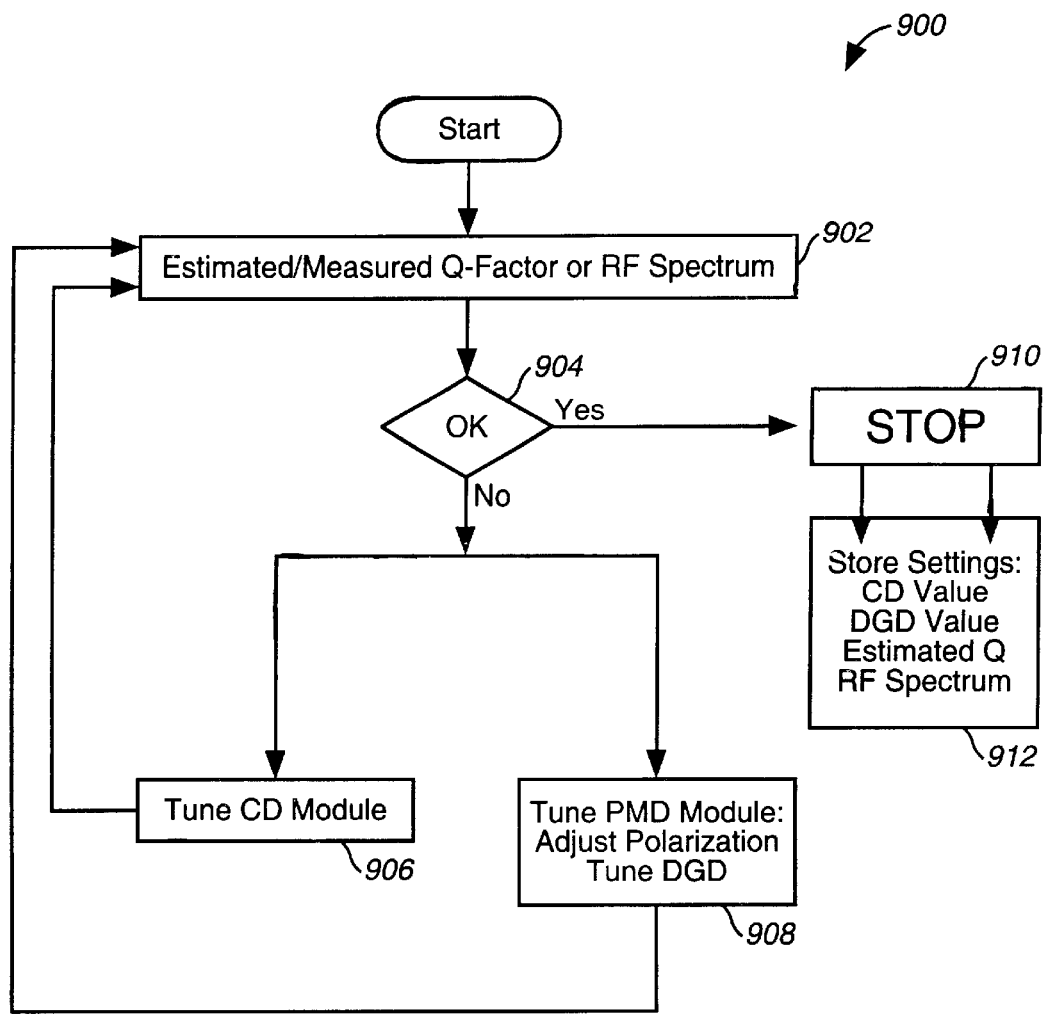
FIG. 9 is a method of performing dispersion compensation in accordance with yet another embodiment of the present invention.

As embodied herein and depicted in FIG. 9, a method for performing dispersion compensation in accordance with yet another embodiment of the present invention is disclosed. The method of FIG. 9 is stored in a memory in the control electronics in receiver 40 (first embodiment), or the control electronics 402 in the second embodiment. Again, these devices will be referred to as the "controller" in the following description. In step 902, the receiver, or an optical monitor in the receiver, measures the Q-factor, BER, or some other relevant measurement characteristic. In step 904, the control electronics compares the measured characteristic with a predetermined optimal range of values. If the measured characteristic is within the optimal range, no compensation is performed, and the controller stores the CD value, the DGD value with the measured characteristic. If the measured characteristic is not in an optimal range of values, the controller performs steps 906 and 908 substantially simultaneously using one feedback control signal to tune CD compensation portion 20 and another feedback control signal to tune PMD compensation portion 30. Once the measured characteristic is driven into the optimal range, program flow is directed to step 910, and the controller stores the CD value, the DGD value with the measured characteristic in step 912.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An integrated system for performing dispersion compensation on at least one wavelength channel, the system comprising:
    a tunable integrated dispersion compensation module configured to
    perform chromatic dispersion compensation and polarization mode dispersion compensation on the at least one wavelength channel;
    the tunable integrated dispersion compensation module further comprising:
    a chromatic dispersion compensation portion configured to perform chromatic dispersion compensation on the at least one wavelength channel; and
    a polarization mode dispersion compensation portion configured to perform polarization mode dispersion compensation on the at least one wavelength channel, wherein the polarization mode dispersion compensation portion includes a polarization controller and a tunable differential delay unit; and
    a feedback element coupled to the chromatic dispersion compensation portion, the polarization controller and the tunable differential delay unit, the feedback element being configured to provide a feedback control signal to thereby adjust the tunable integrated dispersion compensation module until a predetermined characteristic of the at least one wavelength channel is optimized.

2. The system of claim 1, wherein the at least one wavelength channel is a WDM signal.

3. The system of claim 2, wherein the polarization mode dispersion compensation portion is adjusted after the chromatic dispersion compensation portion is adjusted to optimize the predetermined characteristic.

4. The system of claim 2, further comprising:
    a demultiplexer coupled to an input portion of the tunable integrated dispersion compensation module, the demultiplexer being configured to demultiplex the WDM signal into a plurality of wavelength channels; and
    a multiplexer coupled to an output portion of the tunable integrated dispersion compensation module, the multiplexer being configured to multiplex the plurality of wavelength channels into a dispersion compensated WDM signal.

5. The system of claim 4, wherein the demultiplexer includes a grating.

6. The system of claim 4, wherein the demultiplexer includes a prism.

7. The system of claim 4, wherein the multiplexer includes a grating.

8. The system of claim 4, wherein the multiplexer includes a prism.

9. The system of claim 2, wherein the tunable integrated dispersion compensation module further comprises:
    a polarization beam splitter coupled to an input portion of the tunable integrated dispersion compensation module, the polarization beam splitter being configured to split the WDM signal into two mutually orthogonal WDM signals; and
    a polarization beam combiner coupled to an output portion of the tunable integrated dispersion compensation module, the polarization beam combiner being configured to combine two mutually orthogonal signals.

10. The system of claim 2, wherein the tunable integrated dispersion compensation module is configured to perform chromatic dispersion compensation before performing polarization mode dispersion compensation.

11. The system of claim 2, wherein the tunable integrated dispersion compensation module is configured to perform chromatic dispersion compensation and polarization mode dispersion compensation substantially simultaneously.

12. The system of claim 1, wherein the chromatic dispersion compensation portion includes a second differential delay unit.

13. The system of claim 12, wherein the second differential delay unit includes a fiber Bragg grating element.

14. The system of claim 1, wherein the tunable differential delay unit includes a fiber Bragg grating element.

15. The system of claim 1, wherein the feedback module further comprises:
    a monitor configured to measure the at least one characteristic; and
    a controller coupled to the monitor, the controller being configured to derive the feedback control signal from the measured at least one characteristic.

16. The system of claim 1, wherein the at least one characteristic is a bit error rate.

17. The system of claim 1, wherein the at least one characteristic is a Q-factor.

18. The system of claim 1, wherein the at least one characteristic is a DGD value.

19. An integrated optical receiver system for receiving at least one wavelength channel in an optical transmission, the system comprising:
    a controller configured to measure at least one characteristic of the at least one wavelength channel, and generate at least one control signal in accordance with the measured at least one characteristic;
    a feedback element coupled to the controller, the feedback element being configured to propagate the at least one control signal; and
    an integrated dispersion compensation module configured to apply chromatic dispersion compensation and polarization mode dispersion compensation to the at least one wavelength channel in accordance with the at least one control signal to thereby optimize the at least one characteristic, wherein the integrated dispersion compensation module further comprises:
a chromatic dispersion compensation portion configured to perform chromatic dispersion compensation on the at least one wavelength channel, and
a polarization mode dispersion compensation portion configured to perform polarization mode dispersion compensation on the at least one wavelength channel, wherein the polarization mode dispersion compensation portion includes a polarization controller and a tunable differential delay unit, and
wherein the chromatic dispersion compensation portion, the polarization controller and the tunable differential delay unit are responsive to the at least one control signal to the thereby optimize the at least one characteristic.

20. TOhe system of claim 19, wherein the at least one wavelength channel is a WDM signal.

21. The system of claim 20, further comprising:
a demultiplexer coupled to an input portion of the tunable integrated dispersion compensation module, the demultiplexer being configured to demultiplex the WDM signal into a plurality of wavelength channels; and
a multiplexer coupled to an output portion of the tunable integrated
dispersion compensation module, the multiplexer being configured to multiplex the plurality of wavelength channels into a dispersion compensated WDM signal.

22. The system of claim 21, wherein the demultiplexer includes a grating.

23. The system of claim 21 wherein the demultiplexer includes a prism.

24. The system of claim 21, wherein the multiplexer includes a grating.

25. The system of claim 21, wherein the multiplexer includes a prism.

26. The system of claim 20, wherein the tunable integrated dispersion compensation module further comprises:
a polarization beam splitter coupled to an input portion of the tunable integrated dispersion compensation module, the polarization beam splitter being configured to split the WDM signal into two mutually orthogonal WDM signals; and
a polarization beam combiner coupled to an output portion of the tunable integrated dispersion compensation module, the polarization beam combiner being configured to combine two mutually orthogonal signals.

27. The system of claim 20, wherein the tunable integrated dispersion compensation module is configured to perform chromatic dispersion compensation before performing polarization mode dispersion compensation.

28. The system of claim 20, wherein the tunable integrated dispersion compensation module is configured to perform chromatic dispersion compensation and polarization mode dispersion compensation substantially simultaneously.

29. The system of claim 19, wherein the at least one characteristic is a bit error rate.

30. The system of claim 19, wherein the at least one characteristic is a Q-factor.

31. The system of claim 19, wherein the at least one characteristic is a DOD value.

32. A method for performing dispersion compensation in a receiver in an optical network, the method comprising:
providing an integrated dispersion compensation module, the integrated dispersion compensation module being coupled to the receiver via a feedback control loop;
measuring at least one characteristic of at least one wavelength channel in an optical transmission;
transmitting a first feedback control signal to the integrated dispersion compensation module via the control loop, the first control signal being derived from the measured at least one characteristic, whereby the integrated dispersion compensation module applies chromatic dispersion compensation to the at least one wavelength signal channel in response to the first feedback control signal;
transmitting a second control signal to the integrated dispersion compensation module via the control loop, the second control signal being derived from the measured at least one characteristic, whereby the integrated dispersion compensation module applies polarization control to the at least one wavelength signal in response to the second feedback control signal; and
transmitting a third control signal to the integrated dispersion compensation module via the control loop the third control signal being derived from the measured at least one characteristic, the integrated dispersion compensation module applying polarization mode dispersion compensation to the at least one wavelength signal in response to the third feedback control signal.

33. The method of claim 32, wherein the at least one wavelength channel is a WDM signal.

34. The method of claim 33, further comprising the steps of
demultiplexing the WDM signal into a plurality of wavelength channels prior to the step of measuring; and
multiplexing the plurality of wavelength channels into a dispersion compensated WDM signal after the step of transmitting a second control signal.

35. The method of claim 33, wherein the tunable integrated dispersion compensation module performs both chromatic dispersion compensation and polarization mode dispersion compensation substantially simultaneously.

36. The method of claim 35, further comprising the steps of
splitting the WDM signal into two mutually orthogonal WDM signals prior to the step of measuring; and
combining the two mutually orthogonal signals after the step of transmitting a second control signal.

37. The method of claim 32, wherein the at least one characteristic is a bit error rate.

38. The method of claim 37, further comprising the step of storing a chromatic dispersion value of the at least one wavelength channel when the bit error rate is in an acceptable predetermined range.

39. The method of claim 37, further comprising the step of storing a DOD value of the at least one wavelength channel when the bit error rate is in an acceptable predetermined range.

40. The method of claim 32, wherein the at least one characteristic is a Q-factor.

41. The method of claim 40, further comprising the step of storing a chromatic dispersion value of the at least one wavelength channel when the Q-factor is in an acceptable predetermined range.

42. The method of claim 40, further comprising the step of storing a DGD value of the at least one wavelength channel when the Q-factor is in an acceptable predetermined range.

43. The method of claim 32, wherein the at least one characteristic is a DGD value.

44. A method for performing dispersion compensation in an optical network, the method comprising:

providing an integrated dispersion compensation module, the integrated dispersion compensation module being coupled to a receiver via a feedback control loop, the integrated dispersion compensation module comprising a polarization controller and a tunable differential delay unit;

measuring at least one characteristic of at least one wavelength channel in an optical transmission;

transmitting at least one feedback control signal to the integrated dispersion compensation module via the control loop, the at least one feedback control signal being derived from the measured at least one characteristic, whereby the integrated dispersion compensation module applies chromatic dispersion compensation and polarization mode dispersion compensation substantially simultaneously to the at least one wavelength signal in response to the at least one feedback control signal.

45. The method of claim 44, wherein the at least one wavelength channel is a WDM signal.

46. The method of claim 45, further comprising the steps of
demultiplexing the WDM signal into a plurality of wavelength channels prior to the step of measuring; and
multiplexing the plurality of wavelength channels into a dispersion compensated WDM signal after the step of transmitting at least one feedback control signal.

47. The method of claim 45, further comprising the steps of
splitting the WDM signal into two mutually orthogonal WDM signals prior to the step of measuring; and
combining the two mutually orthogonal signals after the step of transmitting at least one feedback control signal.

48. The method of claim 44, wherein the at least one characteristic is a bit error rate.

49. The method of claim 48, further comprising the step of storing a chromatic dispersion value of the at least one wavelength channel when the bit error rate is in an acceptable predetermined range.

50. The method of claim 48, further comprising the step of storing a DOD value of the at least one wavelength channel when the bit error rate is in an acceptable predetermined range.

51. The method of claim 44, wherein the at least one characteristic is a Q-factor.

52. The method of claim 51, further comprising the step of storing a chromatic dispersion value of the at least one wavelength channel when the Q-factor is in an acceptable predetermined range.

53. The method of claim 51, further comprising the step of storing a DGD value of the at least one wavelength channel when the Q-factor is in an acceptable predetermined range.

54. The method of claim 44, wherein the at least one characteristic is a DOD value.

55. An integrated system for performing dispersion compensation on at least one wavelength channel, the system comprising:
a tunable integrated dispersion compensation module configured to perform chromatic dispersion compensation and polarization mode dispersion compensation on the at least one wavelength channel; and
a feedback element coupled to the integrated dispersion compensation module, the feedback element being configured to provide a feedback control signal to thereby adjust the tunable integrated dispersion compensation module until a predetermined characteristic of the at least one wavelength channel is optimized,
wherein the tunable integrated dispersion compensation module includes a tunable differential delay unit, and
wherein the tunable differential delay unit performs both chromatic dispersion compensation and polarization mode dispersion compensation.

56. The system of claim 55, wherein the tunable differential delay unit performs both chromatic dispersion compensation and polarization mode dispersion compensation substantially simultaneously.

57. An integrated system for performing dispersion compensation on at least one wavelength channel, the system comprising:
a tunable integrated dispersion compensation module configured to perform chromatic dispersion compensation and polarization mode dispersion compensation on the at least one wavelength channel; and
a feedback element coupled to the integrated dispersion compensation module, the feedback element being configured to provide a feedback control signal to thereby adjust the tunable integrated dispersion compensation module until a predetermined characteristic of the at least one WDM signal is optimized wherein the tunable integrated dispersion compensation module further comprises:
a polarization beam splitter coupled to an input portion of the tunable integrated dispersion compensation module, the polarization beam splitter being configured to split the WDM signal into two mutually orthogonal WDM signals; and
a polarization beam combiner coupled to an output portion of the tunable integrated dispersion compensation module, the polarization beam combiner being configured to combine two mutually orthogonal signals.

58. An integrated optical receiver system for receiving at least one wavelength channel in an optical transmission, the system comprising:
a controller configured to measure at least one characteristic of the at least one wavelength channel, and generate at least one control signal in accordance with the measured at least one characteristic;
a feedback element coupled to the controller, the feedback element being configured to propagate the at least one control signal; and
an integrated dispersion compensation module configured to apply chromatic dispersion compensation and polarization mode dispersion compensation to the at least one wavelength channel in accordance with the at least one control signal to optimize the at least one characteristic,
wherein the tunable integrated dispersion compensation module includes a tunable differential delay unit that performs both chromatic dispersion compensation and polarization mode dispersion compensation.

59. The system of claim 58, wherein the differential delay unit performs both chromatic dispersion compensation and polarization mode dispersion compensation substantially simultaneously.

60. An integrated optical receiver system for receiving at least one wavelength channel in an optical transmission, the system comprising:
a controller configured to measure at least one characteristic of the at least one wavelength channel, and generate at least one control signal in accordance with the measured at least one characteristic;

a feedback element coupled to the controller, the feedback element being configured to propagate the at least one control signal; and an integrated dispersion compensation module configured to apply chromatic dispersion compensation and polarization mode dispersion compensation to the at least one wavelength channel in accordance with the at least one control signal to optimize the at least one characteristic, wherein the tunable integrated dispersion compensation module further comprises:

a polarization beam splitter coupled to an input portion of the tunable integrated dispersion compensation module, the polarization beam splitter being configured to split the WDM signal into two mutually orthogonal WDM signals; and a polarization beam combiner coupled to an output portion of the tunable integrated dispersion compensation module, the polarization beam combiner being configured to combine two mutually orthogonal signals.

* * * * *